US007295542B2

(12) United States Patent
Xu

(10) Patent No.: US 7,295,542 B2
(45) Date of Patent: Nov. 13, 2007

(54) SYSTEM AND METHOD FOR BEACON TIMING CONTROL IN A MIXED IEEE 802.11 NETWORK

(75) Inventor: Shugong Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 646 days.

(21) Appl. No.: 10/793,306

(22) Filed: Mar. 4, 2004

(65) Prior Publication Data

US 2005/0195776 A1   Sep. 8, 2005

(51) Int. Cl.
    *H04Q 7/24* (2006.01)
(52) U.S. Cl. ............... 370/338; 370/310.2; 370/322; 370/326; 370/329; 370/341; 370/443; 370/445; 370/448; 455/450; 455/451; 455/452.1
(58) Field of Classification Search ............... 370/338, 370/310.2, 322, 326, 329, 341, 443, 445, 370/448; 455/450, 451, 452.1
See application file for complete search history.

(56) References Cited

U.S. PATENT DOCUMENTS

| 6,937,591 | B2* | 8/2005 | Guo et al. ............... 370/338 |
| 7,046,650 | B2* | 5/2006 | Sherman ............... 370/338 |
| 7,046,690 | B2* | 5/2006 | Sherman ............... 370/445 |
| 7,133,381 | B2* | 11/2006 | Sherman ............... 370/329 |
| 2002/0184389 | A1* | 12/2002 | Sherman ............... 709/245 |
| 2003/0114204 | A1 | 6/2003 | Allen et al. ............... 455/574 |
| 2003/0123405 | A1* | 7/2003 | del Prado et al. ........... 370/331 |
| 2003/0128684 | A1* | 7/2003 | Hirsch et al. ............... 370/338 |
| 2004/0022219 | A1* | 2/2004 | Mangold et al. ............ 370/336 |

FOREIGN PATENT DOCUMENTS

JP          11340934     * 1/2000

* cited by examiner

*Primary Examiner*—Steven M. D'Agosta
(74) *Attorney, Agent, or Firm*—Law Office of Gerald Maliszewski; Gerald Maliszewski

(57) ABSTRACT

In a mixed IEEE 802.11 network, a system and method are provided for preventing beacon delays. The method comprises: establishing communications between an IEEE 802.11e access point (QAP) and at least one IEEE 802.11 station (STA); determining a safety interval with an end-point; generating red-zone transmissions; and, in response to the red-zone transmissions, preventing STAs from transmitting a message having a length that exceeds the safety interval endpoint. For example the safety interval endpoint may be the TBTT. More particularly, the method: calculates a safety interval duration in response a minimum PHY rate of the STA; and, maintains the calculated safety interval duration in response to preventing STAs from transmitting a message having a length that exceeds the safety interval endpoint. In one aspect of the method, a single red-zone transmission is sent having a length approximately equal to the duration of the safety interval.

20 Claims, 3 Drawing Sheets

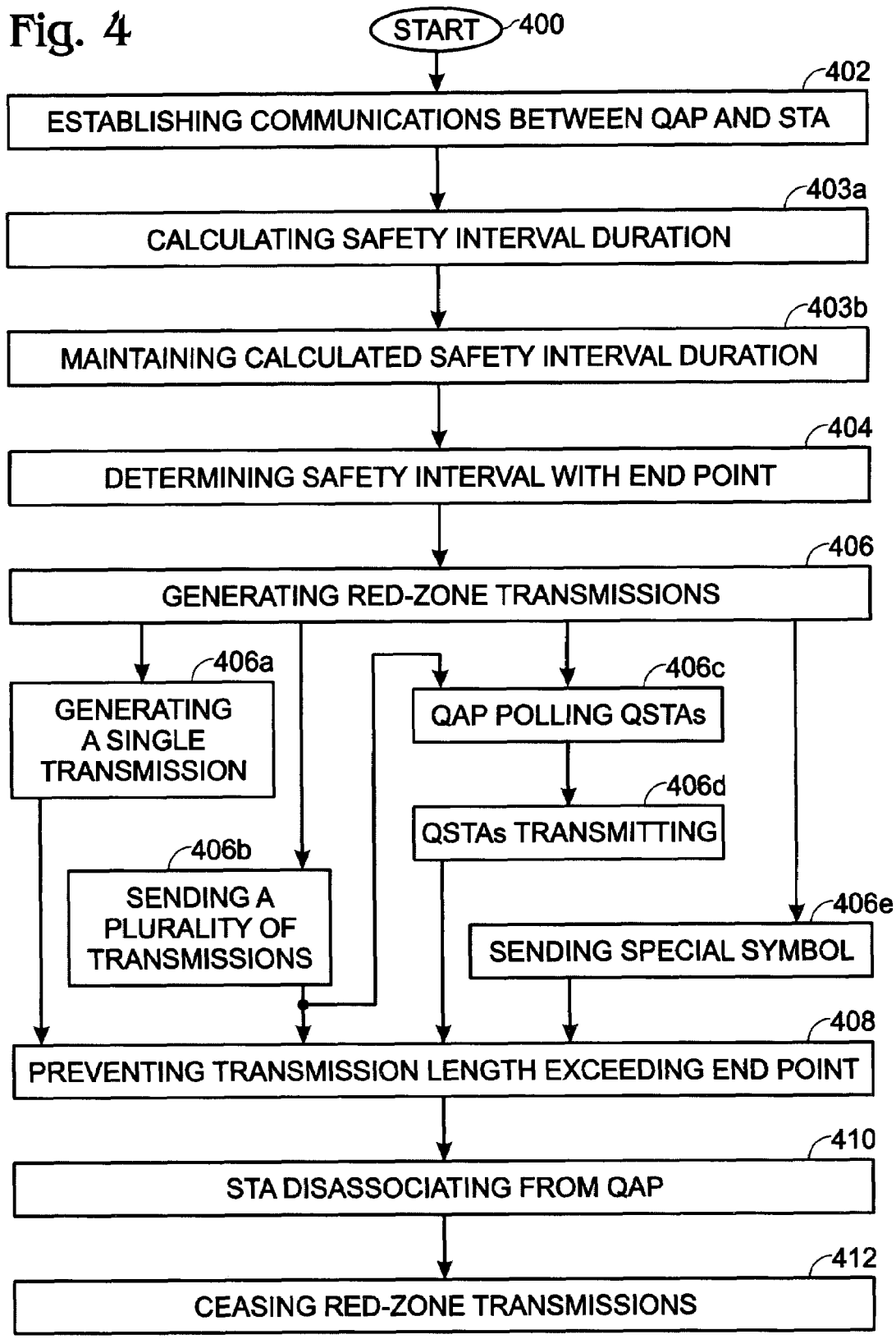

SYSTEM AND METHOD FOR BEACON TIMING CONTROL IN A MIXED IEEE 802.11 NETWORK

BACKGROUND OF THE INVENTION

1. Field of the Invention

This invention generally relates to IEEE 802.11 communications and, more particularly, to a system of method for controlling beacon timing when a communications network includes both 802.11 and 802.11e participants.

2. Description of the Related Art

To minimize contention on a shared communication link or channel, IEEE 802.11 participants are synchronized to operate with respect to a common clock. Clock synchronization is maintained with the use of a beacon signal sent at target beacon transmission time (TBTT). That is, the beacon is a special management frame sent from an access point to synchronize station local timers, and to deliver protocol-related parameters. Normally, the beacon is a signal that represents the start of the contention free period. An access point/hybrid coordinator/point coordinator (AP/HC/PC) schedules a beacon for transmission when it has been determined that the medium (channel) has been idle for at least a point coordination function interframe space (PIFS). However, problems associated with the TBTT may occur if legacy 802.11 stations are participating in the network.

FIG. 1 is a timing diagram illustrating a beacon delay that occurs as a result of a 802.11 station transmitting during the contention period (CP). From the legacy IEEE 802.11 specification, non-AP stations may start their transmissions, even if the MAC surface data unit (MSDU) delivery cannot be finished before the upcoming TBTT. The rules associated with CP transmissions do not permit a participant to transmit, if the participant senses that the channel is in use. Thus, if a station is transmitting during the scheduled TBTT, the AP cannot transmit a beacon. With respect to the point coordinator function (PCF), the transmission of time-bounded MSDUs, delivered in the contention free period (CFP), is delayed if the beacon frame is delayed. Further, with respect to the hybrid coordinator function (HCF), if the beacon gets delayed in HCF, the schedule and the pending transmission in AP/HC are also delayed. The AP may be forced to change the schedule for HCF transmission in the whole beacon interval. These delays may severely affect the quality of service (QoS), as delays introduce temporal unpredictability, depending on the frame lengths, fragmentation, and the traffic. For example, the unpredictable delays introduced by the above-mentioned problem are considered unacceptable for high quality audio-visual (AV) transmissions as well as the voice applications. These beacon delays can be larger than 20 milliseconds, which results in a noticeable jitter.

In the 802.11e specification, this issue is solved in a QoS basis service set (QBSS) through the use of 802.11e-based QoS stations (QSTAs). If a QSTA cannot finish the complete transmission sequence (including ACK, if ACK is desired) before the end of a transmission opportunity (TXOP), it is not required to send the transmission. Also, the QSTAs may not send a transmission, if it cannot finish the transmission sequence before the time of the next scheduled TBTT.

However, the above-mentioned beacon non-interference rule only applies the QSTAs. Legacy (802.11) STAs do not follow this rule. Thus, in a mixed QBSS, which includes even one legacy STA, there is a chance that the beacon can be delayed. The QoS AP (QAP) may choose to disassociate the STA from the QBSS in some, but not all, circumstances. For example, a legacy STA should be able to gain some level of connectivity in a Hotspot network.

It would be advantageous if the QoS of a QBSS could be maintained when the network includes both 802.11e QSTAs and 802.11 (legacy) STAs.

It would be advantageous if a means could be found of preventing a 802.11 STA from delaying the beacon in a QBSS.

SUMMARY OF THE INVENTION

The present invention prevents legacy wireless local area network (WLAN) STAs from delaying the beacon in a QoS-enabled WLAN BSS (QBSS). As a result, strict QoS applications, associated with QoS-enabled STAs (QSTAs) can be protected, even when the network includes legacy STAs. Generally, the QAP supplies transmissions that prevent a legacy STA from generating a transmission that interferes with the TBTT. This solution permits legacy STAs to have some connectivity in QoS-enabled BSS, without disturbing QoS applications in the network.

Accordingly, in a mixed IEEE 802.11 network, a method is provided for preventing beacon delays. The method comprises: establishing communications between an IEEE 802.11e access point (QAP) and at least one IEEE 802.11 station (STA); determining a safety interval with an end-point; generating red-zone transmissions; and, in response to the red-zone transmissions, preventing STAs from transmitting a message having a length that exceeds the safety interval endpoint. For example the safety interval endpoint may be the TBTT.

More particularly, the method: calculates a safety interval duration in response a minimum PHY rate of the STA; and, maintains the calculated safety interval duration in response to preventing STAs from transmitting a message that has a length exceeding the safety interval endpoint. The maintenance of this interval duration prevents the delay problems mentioned in the Background Section, above.

In one aspect of the method, generating red-zone transmissions means that one red-zone transmission is sent from the QAP having a length approximately equal to the duration of the safety interval. Since the STA senses the channel being used, it will not transmit. Alternately, instead of a single red-zone transmission, the QAP sends a plurality of transmissions having a PIFS interval between transmissions. This permits QSTAs to send transmissions, while preventing a legacy STA transmission.

In another aspect of the method, the QAP generates a red-zone transmission with a header duration/ID field having a special duration symbol. The special duration symbol identifies the QAP transmission as having a length that exceeds the safety interval endpoint. As a result, legacy STAs do not transmit. However, QSTAs in the network identify the special duration symbol as a request for QSTA short-duration transmissions. Thus, the QSTAs may transmit messages in the safety interval that terminate prior to the safety interval endpoint.

Additional details of the above-described method, and a scheduling system for use in a mixed IEEE 802.11 network are provided below.

BRIEF DESCRIPTION OF THE DRAWINGS

FIG. 4 is a flowchart illustrating the present invention method for preventing beacon delays in mixed IEEE 802.11 networks.

DETAILED DESCRIPTION OF THE PREFERRED EMBODIMENTS

Figure 1:
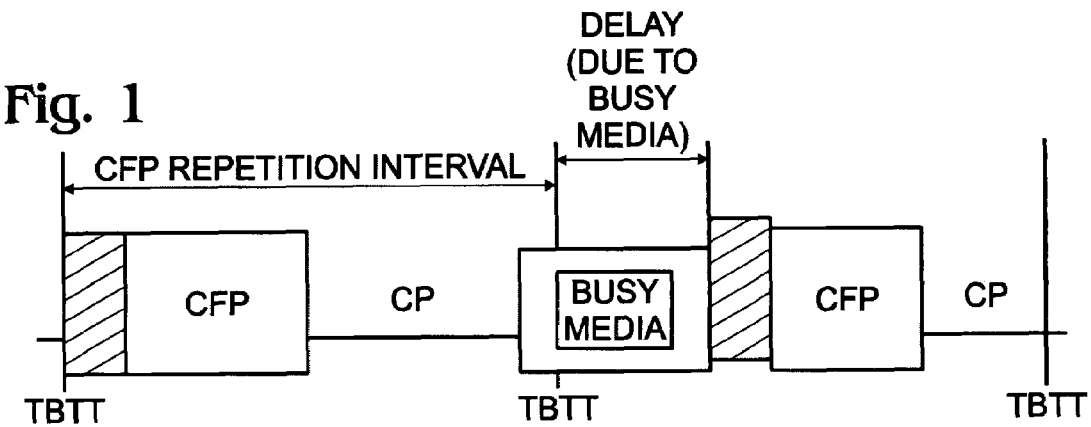
FIG. 1 is a timing diagram illustrating a beacon delay that occurs as a result of a 802.11 station transmitting during the contention period (CP).
Figure 2:
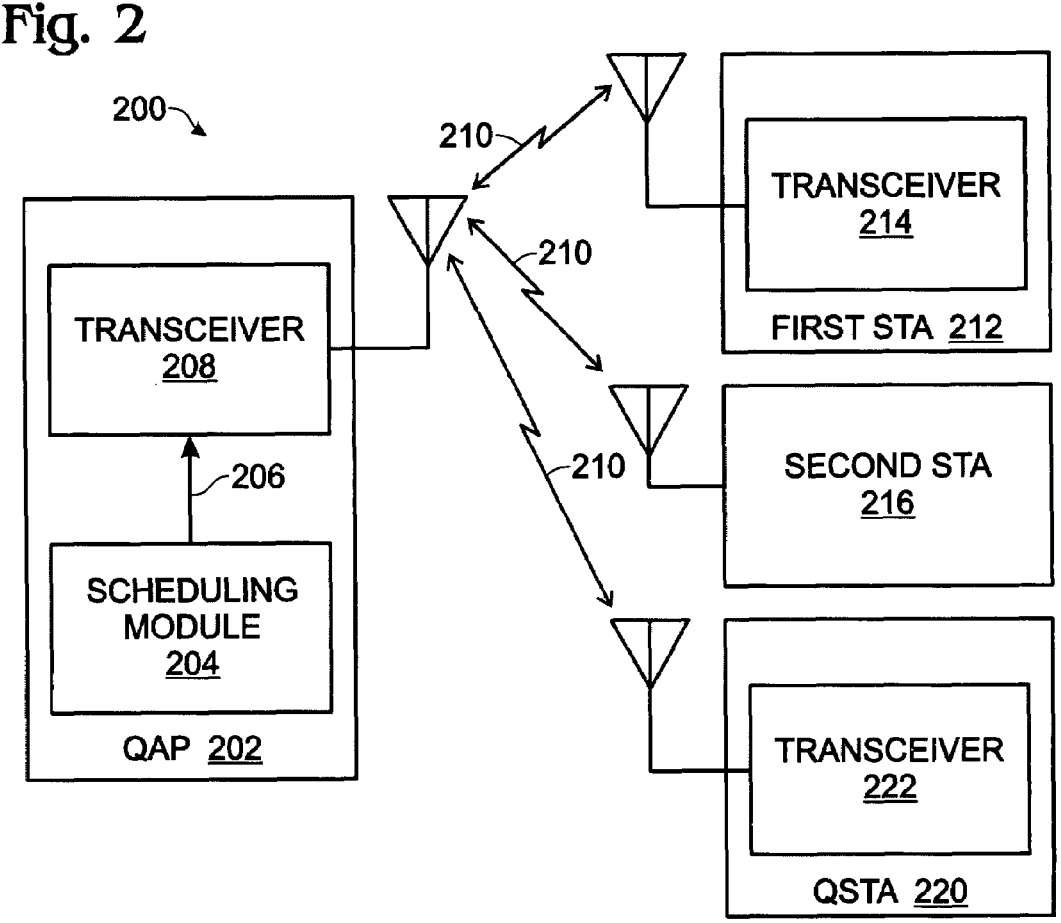
FIG. 2 is a schematic block diagram of the present invention scheduling system as used in a mixed IEEE 802.11 network.

FIG. 2 is a schematic block diagram of the present invention scheduling system as used in a mixed IEEE 802.11 network. A mixed IEEE 802.11 network is a network that includes both 802.11 STAs and QoS STAs. For example, a mixed 802.11 network can be a QBSS that includes a legacy 802.11 STA. As used herein, a STA is defined as a legacy or IEEE 802.11 STA. A QSTA is defined as a IEEE 802.11e, or QoS STA.

The network 200 of FIG. 2 includes an IEEE 802.11e, or QoS access point (QAP) 202. The QAP 202 includes a scheduling module 204 for determining a safety interval with an endpoint. The scheduling module 204 has an output on line 206 to supply red-zone signals. A transceiver 208 has an input on line 206 to receive the red-zone signals and an output on line 210 for transmitting red-zone transmissions in response to the red-zone signals. The transceiver receives transmissions on line 210 having a length that does not exceed the safety interval endpoint.

As shown, reference designator 210 indicates a wireless medium or channel. However, in other aspects of the invention the network 200 may include hardwired connections, or mixed hardwired and wireless connections. In one aspect of the system, the QAP scheduling module 204 generates a red-zone signal for a safety interval prior to a target beacon transmission time (TBTT) endpoint. The TBTT is the target beacon transmission time for the beacon. Once the network starts, the interval value, which is also called the beacon interval, is fixed. The QAP sends the beacon at TBTT, and STAs expect to receive the beacon at that time point as well. Therefore, it may alternately be stated that QAP scheduling module 204 generates a red-zone signal for a safety interval prior to a beacon that occurs at the TBTT.

A first (IEEE 802.11) STA 212 has a transceiver 214 that is prevented from transmitting a message with a length that exceeds the safety interval endpoint, in response to the red-zone transmissions.

Figure 3:
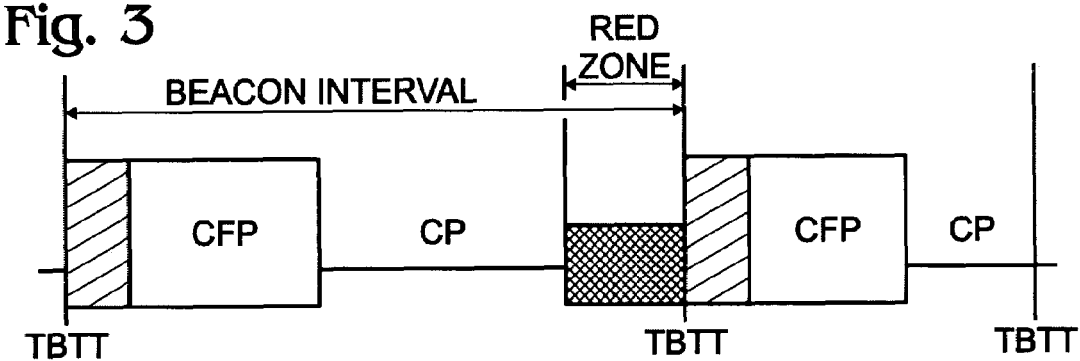
FIG. 3 is a timing diagram introducing the concept of the red-zone, between the CP and the TBTT.

FIG. 3 is a timing diagram introducing the concept of the red-zone, between the CP and the TBTT. The STA in FIG. 2 is not permitted to initiate a transmission that is not terminated by the time of the safety interval endpoint. For example, the safety interval may be the red zone (as shown) and the safety interval endpoint may be the TBTT. The red zone is a time interval in which it is possible for a legacy STA to delay the beacon in the mixed QBSS. That is, it is possible for a STA to begin a transmission, from the start of the red zone interval, which is not finished by the TBTT. Typically, the time needed by a STA to complete a frame exchange is responsive to the STA's minimum PHY rate, minus the DCF interframe space (DIFS), where DCF stands for distributed coordination function. If there is a tolerance in the TBTT delay, the red zone duration may be shortened to accommodate any uncertainty associated with the delay tolerance. The QAP is able to access the minimum PHY rate information from the OperationalRateSet of the STA.

Returning to FIG. 2, the first STA 212 has a first minimum PHY rate. That is, the first minimum PHY rate is the minimum PHY rate associated with the first STA 212. The QAP scheduling module 204 calculates the duration of the safety interval in response the first minimum PHY rate of the first STA 212. The scheduling module 204 maintains the calculated safety interval duration in response to preventing the first STA 212 from transmitting a message with a length that exceeds the safety interval endpoint.

The scheduling module 204 calculates the above-mentioned safety interval duration in response to the STA (or QSTA) in the network having the slowest PHY rate. For example, the system 200 may further comprise a second STA 216 with a second minimum PHY rate, less than the first minimum PHY rate. Then, the QAP scheduling module 204 calculates a safety interval duration in response the second minimum PHY rate of the second STA 216. The scheduling module 204 maintains the calculated safety interval duration in response to preventing the second STA 216 from transmitting a message with a length that exceeds the safety interval endpoint. Alternately stated, the second STA is the STA most likely to send a transmission that would overlap the TBTT, due to its slow PHY rate. The safety interval is, therefore, calculated so that even in the worst-case scenario, the beacon is not delayed.

In one aspect, the QAP transceiver 208 sends one (a single) red-zone transmission having a length approximately equal to the duration of the safety interval, in response to red-zone signals received from the scheduling module 204. This approach is simple, but not necessarily efficient, as it prevents QSTAs in the network 200 from transmitting during the period of the safety interval. Alternately, the QAP transceiver 208 sends a plurality of transmissions having a PIFS interval between transmissions, in response to red-zone commands. The PIFS intervals permit a QSTA to use the channel 210, while preventing a STA from using the channel 210.

For example, the system may further comprise a QSTA 220 with a transceiver 222. The QAP transceiver 208 transmits red-zone transmissions by polling the QSTA 220. The QSTA transceiver 222 transmits messages that terminate prior to the safety interval endpoint. Alternately, the QAP transceiver 208 transmits red-zone transmissions that are a combination of a plurality of transmissions having a PIFS interval between transmissions, and QSTA pollings. Again, the QSTA 220 transmits messages that terminate prior to the safety interval endpoint.

In another aspect of the system, the QAP transceiver 208 transmits red-zone transmissions by sending a transmission with a header duration/ID field having a special duration symbol. The first STA 212 (or second STA 216) identifies the special duration symbol as a large value, corresponding to a QAP transmission length that exceeds the safety interval endpoint. As a result, the first STA 212 does not send a transmission during the safety interval.

However, the QSTA 220 identifies the special duration symbol as a request for QSTA short-duration transmissions. The QSTA 220 may transmit messages in the safety interval that terminate prior to the safety interval endpoint. In one aspect, the QAP transceiver 208 sends a special duration symbol with a value of 32767. However, the present invention is not limited to any particular special duration symbol value.

The following example assumes that the second STA 220 is not part of the network 200, or that the second STA 220 has previously disassociated from the network 200. That is, the first STA 212 is assumed to be the only 802.11 STA in the network 200. In this example the first STA 212 disassociates from the QAP 202. The QAP scheduling module 204 ceases to generate red-zone commands in response to the first STA disassociating from the QAP. Alternately stated, the network 200 is no longer a mixed IEEE 802.11 network, and the QSTAs in the network does not generate transmissions that will delay the safety interval endpoint. Although FIG. 2 shows two STAs and one QSTA, the present invention system is not limited to any particular number of STAs or QSTAs.

Functional Description

The present invention prevents the delay of a safety interval endpoint, such as a TBTT, in the mixed QBSS, which includes a legacy 802.11 STA. In one aspect of the invention, the QAP takes the responsibility of sending a transmission such as buffered downlink data, a QoS-poll for a QSTA, or any other type of frames, in the safety interval, which is also referred to herein as the red zone. The QAP and any QSTAs in the network will not start a transmission if the frame exchange sequence cannot be finished by the safety interval endpoint (TBTT). If the remaining time is not long enough for the transmission of a regular data-frame exchange, the QAP may choose to send some short frames, such as a QoS-Null or the like. The QAP may accomplish this by scheduling a transmission in the beacon interval (see FIG. 3), which includes transmissions in the red zone. In the other words, the QAP scheduling algorithm has the capability of preventing legacy STAs from accessing the channel during the safety interval (red zone).

Alternately, the current version (as of the application filing date) of the IEEE 802.11e co-exist mode specification may be modified. The NAV rule for QSTAs may be changed with respect to the duration/ID field. A special value of 32767, for example, may be defined. After the beginning of the red zone interval, once the channel is sensed free, the QAP issues a special frame exchange sequence containing this special duration/ID field value. For example, the duration/ID field special value may be carried in a QoS-Null frame or in a QoS-Poll addressed to a legacy STA. The legacy STAs does not recognize the value as special, but rather, interprets the duration/ID field as a large NAV. As a result, the STA does not transmit in the red zone interval. QSTAs ignore this value for channel access, which means the QSTAs do not update their NAV after receiving this frame. The value of 32767 was chosen, as it is never used in the duration/ID field of a legacy 802.11 system. However, other values can be used to represent the duration/ID field special value. In another aspect, a specific frame is defined to carry this special value. Then, the QSTAs ignore the special value in those specific frames.

The invention has primarily been described as a means of preventing a legacy STA from accessing a channel in a QBSS, during the red zone interval with a TBTT endpoint. However, the invention has broader applications. For example, the safety interval and safety interval endpoint need not necessarily be used just to prevent beacon delays. There are other scenarios where it is useful for STAs in a QBSS to be denied access to a channel during predetermined intervals. For example, the media access of legacy STAs may purposely be limited, to allocate more time for QoS STAs. In this scenario the safety interval duration is not necessarily responsive to a STA's minimum PHY rate.

FIG. 4 is a flowchart illustrating the present invention method for preventing beacon delays in mixed IEEE 802.11 networks. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 400.

Step 402 establishes communications between a QAP and at least one STA. Step 404 determines a safety interval with an endpoint. For example, Step 404 may determine a safety interval prior to a target beacon transmission time (TBTT) endpoint. Step 406 generates red-zone transmissions. Step 408, in response to the red-zone transmissions, prevents STAs from transmitting a message having a length that exceeds the safety interval endpoint.

In some aspects of the method, Step 403a calculates a safety interval duration in response a minimum PHY rate of the STA. Step 403b maintains the calculated safety interval duration in response to preventing STAs from transmitting a message having a length that exceeds the safety interval endpoint.

In one aspect, designated Step 406a, generating red-zone transmissions includes sending one red-zone transmission from the QAP having a length approximately equal to the duration of the safety interval. In another aspect, Step 406b sends a plurality of transmissions from the QAP having a PIFS interval between transmissions.

In another aspect, Step 402 additionally includes establishing communication between the QAP and at least one QSTA. Then, generating red-zone transmissions in Step 406 includes substeps. In Step 406c, the QAP polls QSTAs. In Step 406d, the QSTAs transmit messages that terminate prior to the safety interval endpoint. It should be noted that the QSTA transmission acts to prevent a STA from accessing the channel during the safety interval. In another variation, Step 406 includes a combination of sending a plurality of transmissions from the QAP having a PIFS interval between transmissions (Step 406a), the QAP polling QSTAs (Step 406c), and the QSTAs transmitting messages that terminate prior to the safety interval endpoint (Step 406d).

In a different aspect, generating red-zone transmission includes the QAP sending a transmission with a header duration/ID field having a special duration symbol (Step 406e). Then, preventing STAs from transmitting a message having a length that exceeds the safety interval endpoint in Step 408 includes substeps (not shown). In Step 408a, STAs identify the special duration symbol as a large value, corresponding to a QAP transmission length that exceeds the safety interval endpoint. In Step 408b, the STAs do not send transmissions during the safety interval. In Step 408c, QSTAs identify the special duration symbol as a request for QSTA short-duration transmissions. In Step 408d, the QSTAs transmit messages in the safety interval that terminate prior to the safety interval endpoint. In some aspects, sending a transmission with a header duration/ID field having a special duration symbol (Step 406e) includes sending a special duration symbol with a value of 32767.

In some aspects of the method, in Step 410, the STA disassociates from the QAP. In Step 412, the QAP ceases to generate red-zone transmissions in response to determining that communications are no longer established with the STA.

A system and method have been described for preventing STA transmissions from occurring in a safety interval, when a network includes both legacy 802.11 and QoS (802.11e) stations. A TBTT has been used as an example of a safety interval endpoint. However, the invention has broader applications. A few specific examples have been used to illustrate the concept of a red-zone transmission. However, the invention is not limited to just these examples. Other variations and embodiments of the invention will occur to those skilled in the art.

The invention claimed is:

1. In mixed IEEE 802.11 networks, a method for preventing beacon delays, the method comprising:
   establishing communications between an IEEE 802.11e access point (QAP) and at least one IEEE 802.11 station (STA);
   determining a safety interval with an endpoint;
   generating red-zone transmissions having durations that extend into a red zone; and,
   in response to the red-zone transmissions, preventing STAs from transmitting a message having a length that exceeds the safety interval endpoint;
   wherein establishing communications between a QAP and at least one STA additionally includes establishing communication between the QAP and at least one IEEE 802.11e quality of service STA (QSTA); and,
   wherein generating red-zone transmissions includes a combination of:
      sending a plurality of transmissions from the QAP having a PIFS interval between transmissions; and,
      the QAP polling QSTAs; and,
      the QSTAs transmitting messages that terminate prior to the safety interval endpoint.

2. The method of claim 1 further comprising:
   calculating a safety interval duration in response a minimum PHY rate of the STA; and,
   maintaining the calculated safety interval duration in response to preventing STAs from transmitting a message having a length that exceeds the safety interval endpoint.

3. The method of claim 1 wherein generating red-zone transmissions includes sending one red-zone transmission from the QAP having a length approximately equal to the duration of the safety interval.

4. The method of cLaim 1 wherein generating red-zone transmissions includes sending a plurality of transmissions from the QAP having a PIFS interval between transmissions.

5. The method of claim 1
   wherein generating red-zone transmissions includes the QAP sending a transmission with a header duration/ID field having a special duration symbol;
   wherein preventing STAs from transmitting a message having a Length that exceeds the safety interval endpoint includes:
      QSTAs identifying the special duration symbol as a request for QSTA short-duration transmissions; and,
      the QSTAs transmitting messages in the safety interval that terminate prior to the safety interval endpoint.

6. The method of claim 5 wherein sending a transmission with a header duration/ID field having a special duration symbol includes sending a special duration symbol with a value of 32767.

7. The method of claim 1 wherein determining a safety interval with an endpoint includes determining a safety interval prior to a target beacon transmission time (TBTT) endpoint.

8. The method of claim 1 further comprising:
   the STA disassociating from the QAP; and,
   the QAP ceasing the generation of red-zone transmissions in response to determining that communications are no longer established with the STA.

9. In mixed IEEE 802.11 networks, a scheduling system, the system comprising:
   an IEEE 802.11e access point (QAP) including;
   a scheduling module for determining a safety interval with an endpoint, having an output to supply red-zone signals;
   a transceiver having an input to receive the red-zone signals and an output for transmitting red-zone transmissions in response to the red-zone signals, having durations that extend into a red zone, and so preventing a first IEEE 802.11 station (STA) from transmitting a message with a length that exceeds the safety interval endpoint;
   wherein the QAP scheduling module calculates a safety interval duration in response a first minimum PHY rate of a first STA, and maintains the calculated safety interval duration in resuonse to preventing the first STA from transmitting a message with a length that exceeds the safety interval endpoint; and,
   wherein th hedulin module calculates a safety interval duration in response a second minimum PHY rate of a second STA, and maintains the calculated safety interval duration in response to preventing the second STA from transmitting a message with a length that exceeds the safety interval endpoint.

10. The system of claim 9 wherein the QAP transceiver sends one red-zone transmission having a length approximately equal to the duration of the safety interval, in response to red-zone signals.

11. The system of claim 9 wherein the QAP transceiver sends a plurality of transmissions having a PIFS interval between transmissions, in response to red-zone signals.

12. The system of claim 9 wherein the QAP transceiver transmits red-zone transmissions by polling an IEEE 802.11e quality of service STA (QSTA) to endure that the QSTA transmits messages that terminate prior to the safety interval endpoint.

13. The system of claim 9 wherein the QAP transceiver transmits red-zone transmissions that are a combination of:
   a plurality of transmissions having a PIFS interval between transmissions; and,
   polling a QSTA and,
   wherein the QAP ensures that QSTA transmissions terminate prior to the safety interval endpoint.

14. The system of claim 9 wherein the QAP transceiver transmits red-zone transmissions by sending a transmission with a header duration/ID field having a special duration symbol which can be identified by a QSTA as a large value, corresponding to a QAP transmission length that exceeds the safety interval endpoint, to enable the transmission of messages in the safety interval that terminate prior to the safety interval endpoint.

15. The system of claim 14 wherein the QAP transceiver sends a special duration symbol with a value of 32767.

16. The system of claim 9 wherein the QAP scheduling module generates red-zone signals for a safety interval prior to a target beacon transmission time (TBTT) endpoint.

17. The system of claim 9 wherein the QAP scheduling module ceases to generate red-zone commands in response to the first STA disassociating from the QAP.

18. In mixed IEEE 802.11 networks, a method for preventing beacon delays, the method comprising:
   establishing communications between an IEEE 802.11e access point (QAF) and at least one IEEE 802.11 station (STA);
   determining a safety interval with an endpoint;
   generating red-zone transmissions having durations that extend into a red zone;

in response to the red-zone transmissions, preventing STAs from transmitting a message having a length that exceeds the safety interval endpoint;

wherein establishing communications between a QAP and at least one STA additionally includes establishing communications between the QAP and at least one QSTA; and, wherein generating red-zone transmissions includes the QAP sending a transmission with a header duration/ID field having a special duration symbol;

wherein preventing STAs from transmitting a message having a length that exceeds the safety interval endpoint includes:
QSTAs identifying the special duration symbol as a request for QSTA short-duration transmissions; and,
the QSTAs transmitting messages in the safety interval that terminate prior to the safety interval endpoint.

19. In mixed IEEE 802.11 networks, a scheduling system, the system comprising:
an IEEE 802.11e access point (QAP) including:
a scheduling module for determining a safety interval with an endpoint, having an output to supply red-zone signals;
a transceiver having an input to receive the red-zone signals and an output for transmitting red-zone transmissions in response to the red-zone signals, having durations that extend into a red zone, and so preventing a first IEEE 802.11 station (STA) from transmitting a message with a length that exceeds the safety interval endpoint;
wherein the QAP transceiver transmits red-zone transmissions that are a combination of:
a plurality of transmissions having a PIFS interval between transmissions; and,
polling a QSTA; and,
wherein the QAP ensures that QSTA transmissions terminate prior to the safety interval endpoint.

20. In mixed IEEE 802.11 networks, a scheduling system, the system comprising:
an IEEE 802.11e access point (QAP) including:
a scheduling module for determining a safety interval with an endpoint, having an output to supply red-zone signals;
a transceiver having an input to receive the red-zone signals and an output for transmitting red-zone transmissions in response to the red-zone signals, having durations that extend into a red zone, and so preventing a first IEEE 802.11 station (STA) from transmitting a message with a length that exceeds the safety interval endpoint; and,
wherein the QAP transceiver transmits red-zone transmissions by sending a transmission with a header duration/ID field having a special duration symbol which can be identified by a QSTA as a large value, corresponding to a QAP transmission length that exceeds the safety interval endpoint, to enable the transmission of messages in the safety interval that terminate prior to the safety interval endpoint.

* * * * *

UNITED STATES PATENT AND TRADEMARK OFFICE
CERTIFICATE OF CORRECTION

PATENT NO. : 7,295,542 B2
APPLICATION NO. : 10/793306
DATED : November 13, 2007
INVENTOR(S) : Shugong Xu It is certified that error appears in the above-identified patent and that said Letters Patent is hereby corrected as shown below:

In col. 8, line 17, of claim 9, the phrase "wherein the QAP scheduling module....." has been incorrectly printed as "wherein th hedulin module....". Claim 9 should read as follows:

>   9. In mixed IEEE 802.11 networks, a scheduling system, the system comprising:
>   an IEEE 802.11e access point (QAP) including:
>   a scheduling module for determining a safety interval with an endpoint, having an output to supply red-zone signals;
>   a transceiver having an input to receive the red-zone signals and an output for transmitting red-zone transmissions in response to the red-zone signals, having durations that extend into a red zone, and so preventing a first IEEE 802.11 station (STA) from transmitting a message with a length that exceeds the safety interval endpoint;
>   wherein the QAP scheduling module calculates a safety interval duration in response a first minimum PHY rate of a first STA, and maintains the calculated safety interval duration in response to preventing the first STA from transmitting a message with a length that exceeds the safety interval endpoint; and,
>   wherein the QAP scheduling module calculates a safety interval duration in response a second minimum PHY rate of a second STA, and maintains the calculated safety interval duration in response to preventing the second STA from transmitting a message with a length that exceeds the safety interval endpoint.

Signed and Sealed this

Eleventh Day of March, 2008

JON W. DUDAS
*Director of the United States Patent and Trademark Office*